(12) United States Patent
Hwang (10) Patent No.: US 9,389,647 B2
(45) Date of Patent: Jul. 12, 2016

(54) ELECTRONIC DEVICE HAVING HINGE STRUCTURE AND OPERATING METHOD THEREOF

(71) Applicant: Samsung Electronics Co., Ltd., Gyeonggi-do (KR)

(72) Inventor: Sun-Lyeong Hwang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/322,500

(22) Filed: Jul. 2, 2014

(65) Prior Publication Data
US 2015/0022442 A1    Jan. 22, 2015

(30) Foreign Application Priority Data
Jul. 17, 2013   (KR) .................. 10-2013-0083950

(51) Int. Cl.
*G06F 1/16* (2006.01)
*G06F 1/32* (2006.01)

(52) U.S. Cl.
CPC ............ *G06F 1/1681* (2013.01); *G06F 1/1618* (2013.01); *G06F 1/3262* (2013.01)

(58) Field of Classification Search
CPC .............................. G06F 1/1681; G06F 1/162
See application file for complete search history.

(56) References Cited

U.S. PATENT DOCUMENTS

| | | | |
|---|---|---|---|
| 2002/0090970 A1* | 7/2002 | Ko ................................. | 455/550 |
| 2007/0242421 A1 | 10/2007 | Goschin et al. | |
| 2009/0160822 A1* | 6/2009 | Eguchi et al. ................. | 345/174 |
| 2009/0219673 A1* | 9/2009 | Tamura et al. ................. | 361/676 |
| 2011/0115737 A1* | 5/2011 | Fuyuno ................. | G06F 1/1616 345/173 |
| 2012/0300380 A1 | 11/2012 | Lin et al. | |
| 2013/0010424 A1 | 1/2013 | Degner et al. | |

* cited by examiner

*Primary Examiner* — Shaheda Abdin
(74) *Attorney, Agent, or Firm* — The Farrell Law Firm, P.C.

(57) ABSTRACT

An electronic device is provided, which includes a first case frame, a second case frame, a hinge portion, and a processor. The first case frame includes a keypad. The second case frame is installed to be rotatable from the first case frame, and includes a touchscreen. The hinge portion couples the first case frame with the second case frame, and is rotatably installed to rotate the second case frame. The processor controls to determine an operation mode of the electronic device depending on rotation of the hinge portion.

14 Claims, 12 Drawing Sheets

ELECTRONIC DEVICE HAVING HINGE STRUCTURE AND OPERATING METHOD THEREOF

PRIORITY

This application claims priority under 35 U.S.C. §119(a) to a Korean Patent Application filed in the Korean Intellectual Property Office on Jul. 17, 2013 and assigned Serial No. 10-2013-0083950, the entire disclosure of which is incorporated herein by reference.

BACKGROUND OF THE INVENTION

1. Field of the Invention

The present invention generally relates to an electronic device, and more particularly, to an electronic device having a hinge structure and an operating method thereof.

2. Description of the Related Art

With the development of the electronic communication industry, electronic devices such as a mobile communication terminal (a smartphone), an electronic scheduler, a Personal Digital Assistant (PDA), a Television (TV), a laptop computer, a tablet Personal Computer (PC), etc., have become a necessity, and play an important role in transferring information. The electronic devices provide a convenient operation environment to a user via a Graphic User Interface (GUI) and provide various multimedia based on a web environment.

Electronic devices are constructed with various types of structures, and are referred to as a mutual hinged type, a sliding type, a popup type, a swivel type, etc. depending on its construction. However, an electronic device having these type of structures changes in only its shape and provides the same function, and may not meet the consumer's desire.

SUMMARY OF THE INVENTION

The present invention has been made to address at least the above-mentioned problems and/or disadvantages and to provide at least the advantages described below. Accordingly, an aspect of the present invention provides an electronic device having a hinge structure and an operating method thereof.

Another aspect of the present invention is to provide an electronic device whose operation mode changes depending on the form of the electronic device, and an operating method thereof.

In accordance with an aspect of the present invention, an electronic device is provided which includes a first case frame including a keypad, a second case frame installed to be rotatable from the first case frame and including a touchscreen, a hinge portion for coupling the first case frame with the second case frame, and rotatably installed to rotate the second case frame, and a processor for controlling to determine an operation mode of the electronic device depending on rotation of the hinge portion.

In accordance with another aspect of the present invention, a method for operating an electronic device is provided. The method includes detecting rotation of a hinge portion, the hinge portion coupling a first case frame and a second case frame forming the electronic device, and determining an operation mode of the electronic device depending on the detected rotation of the hinge portion, wherein the first case frame includes a keypad and the second case frame includes a touchscreen.

In accordance with still another aspect of the present invention, an electronic device is provided which includes at least one processor, a memory, and at least one program stored in the memory and executed by the at least one processor, wherein the program detects rotation of a hinge portion, the hinge portion coupling a first case frame and a second case frame forming the electronic device, and the program determines an operation mode of the electronic device depending on the detected rotation of the hinge portion, the first case frame includes a keypad, and the second case frame includes a touchscreen.

BRIEF DESCRIPTION OF THE DRAWINGS

The above and other aspects, features and advantages of embodiments of the present invention will be more apparent from the following description taken in conjunction with the accompanying drawings in which.

Throughout the drawings, like reference numerals will be understood to refer to like parts, components and structures.

DETAILED DESCRIPTION OF EMBODIMENTS OF THE PRESENT INVENTION

The following description with reference to the accompanying drawings is provided to assist in a comprehensive understanding of embodiments of the present invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their dictionary meanings, but, are merely used to enable a clear and consistent understanding of the invention. Accordingly, it should be apparent to those skilled in the art that the following description of embodiments of the present invention are provided for illustration purposes only and not for the purpose of limiting the invention as defined by the appended claims and their equivalents.

Though an electronic device including a touchscreen as a display unit and to which a hinge structure is applicable is illustrated below and explained in describing various embodiments of the present invention, it is not limited thereto. For example, the present invention is applicable to various devices that apply a hinge structure, such as a PDA, a laptop computer, a mobile phone, a smartphone, a netbook, a Mobile Internet Device (MID), an Ultra Mobile PC (UMPC), a tablet PC, a note PC, a navigation device, an MP3 player, etc. Also, the electronic device may be an electronic device including a device combining two or more functions among these devices.

Figure 1:
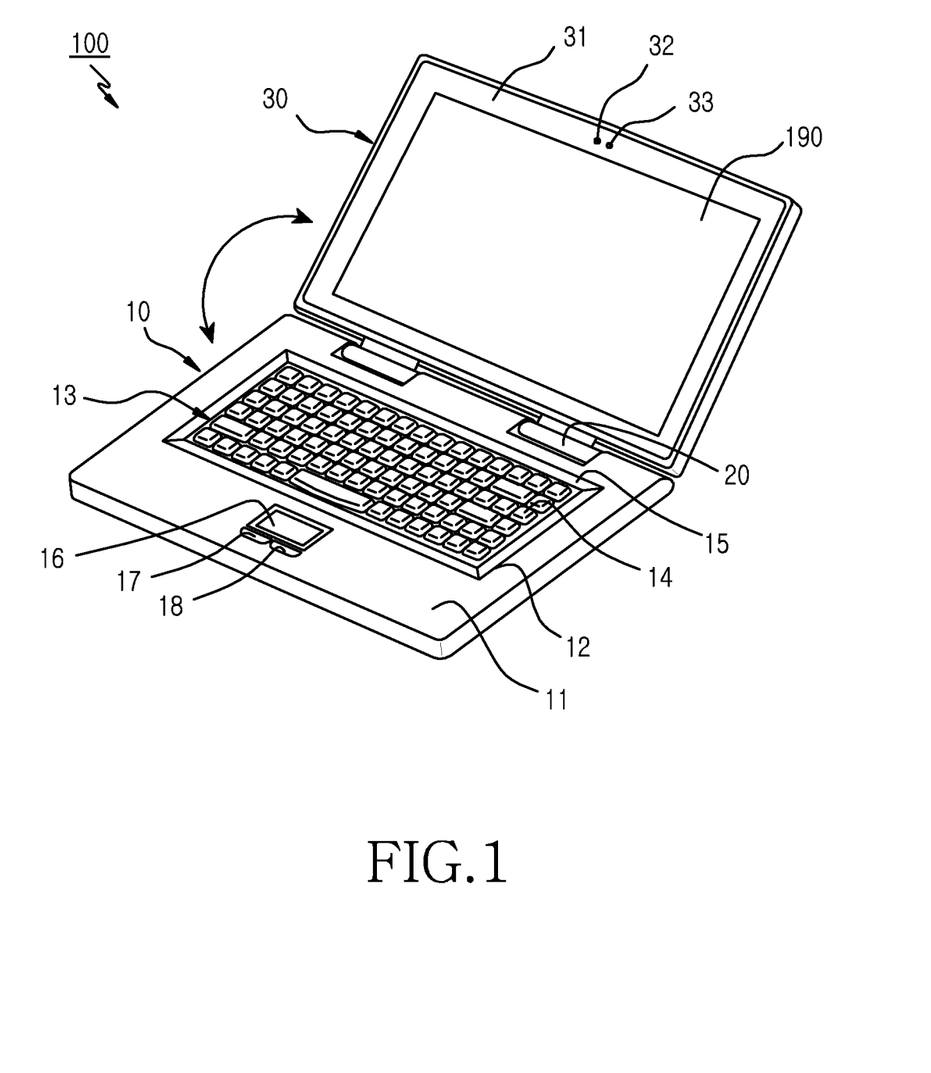
FIG. 1 is a front perspective view illustrating an electronic device according to an embodiment of the present invention.
Figure 2:
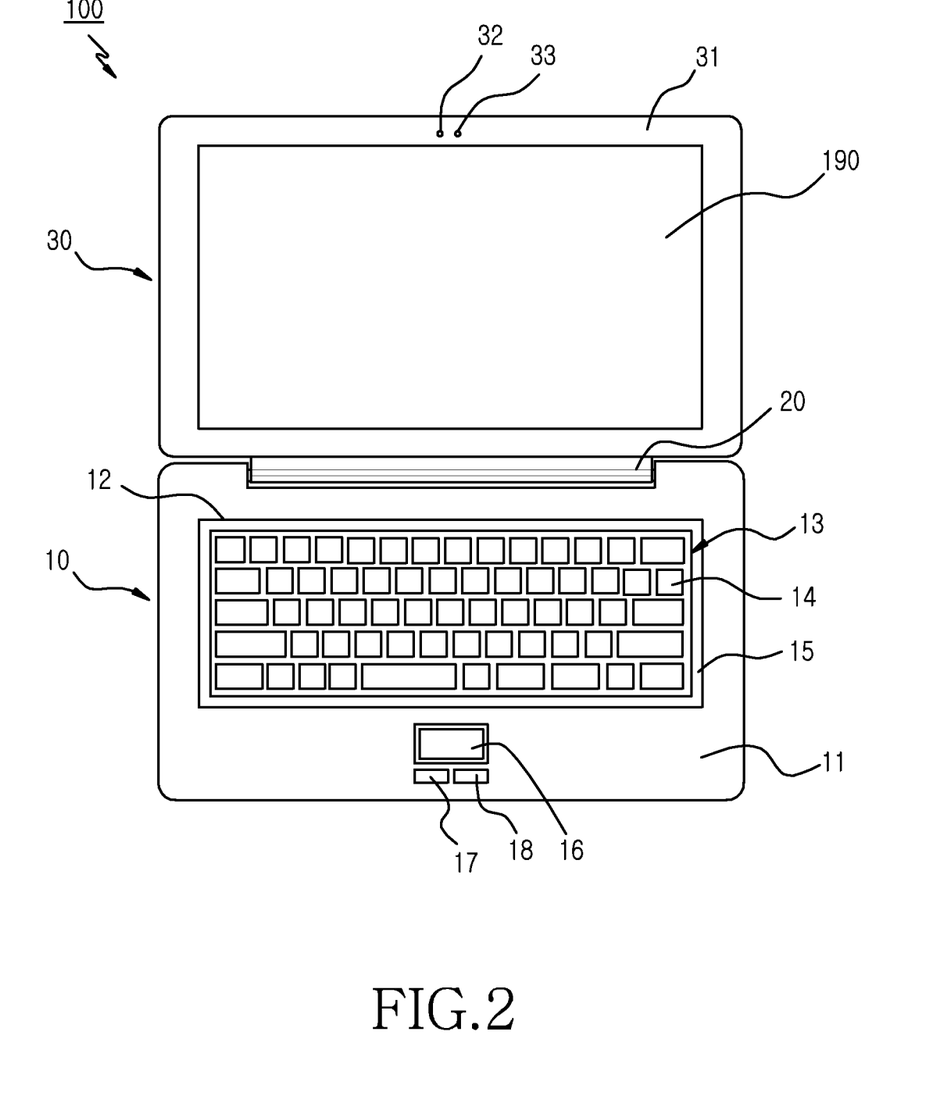
FIG. 2 is a plan view illustrating an electronic device according to an embodiment of the present invention.

FIG. 1 is a front perspective view illustrating an electronic device 100, and FIG. 2 is a plan view illustrating an electronic device 100 according to an embodiment of the present invention.

Though the present invention illustrates and describes a laptop PC as an electronic device 100, it is not limited thereto. For example, the present invention is applicable to various electronic devices performing a voice communication function or a communication function.

As illustrated in FIGS. 1 and 2, the electronic device 100 may include a first case frame 10 having a keypad 13, a second case frame 30 having a touchscreen 190, and one or more hinge portions 20 configured such that the second case frame 30 rotates by a predetermined angle from the first case frame 10.

The first case frame 10 may have a rectangular shape and an outer surface of the first case frame 10 may be formed to extend without a step difference. A keypad receiving recess 12 for receiving the keypad 13 having a plurality of key buttons 14 may be formed in a front surface 11 of the first case frame 10, and a touchpad 16 for sensing a touch input of an input means such as a finger or a touch pen may be provided on the lower side of the keypad receiving recess 12. A select button 17 for a touch input function, a function button 18, etc. may be disposed on the lower end of the touchpad 16.

The first case frame 10 may include a plurality of inner walls 15 formed to be inclined in the direction of the keypad receiving recess 12. The inner walls 15 may be formed in a predetermined length to facilitate use of the keypad 13.

Though not shown, at least one circuit board may be received in the inner space of the first case frame 10. The circuit board is a substrate where a basic circuit and a plurality of electronic parts are mounted, sets an execution environment of the electronic device 100, maintains information thereof, stably drives the electronic device 100, and allows swift data input/output exchange of all devices of the electronic device 100. The circuit board transfers a signal to the touchscreen 190, and the touchscreen 190 may display a signal from the circuit board as an image.

According to an embodiment of the present invention, at least one magnetic force sensing sensor (reference numeral 40 in FIG. 3) may be installed at a pertinent position of the first case frame 10. The magnetic force sensing sensor 40 senses a magnetic force of at least one magnet (reference numeral M of FIG. 3) installed to the hinge portion 20. The magnetic force sensing sensor 40 detects a rotational angle of the hinge portion 20, and provides the detected information to the circuit board.

The second case frame 30 may have a shape corresponding to the first case frame 10. The outer surface of the second case frame 30 may also be formed to extend without a step difference. The second case frame 30 may be configured to rotate by a predetermined angle from the first case frame 10. The second case frame 30 is connected to the first case frame 10 by the hinge portion 20 and is rotatable in a direction of the arrow in FIG. 1. For example, the second case frame 30 is rotatable up to 360° around a rotational axis.

The second case frame 30 may be disposed in a way such that it is placed on the first case frame 10, and disposed such that it overlaps at least a portion of the keypad 13 of the first case frame 10. Here, where the second case frame 30 rotates with respect to the first case frame 10 to where the second case frame 30 overlaps the keypad 13 of the first case frame 10, the state of the electronic device 100 is described as being closed. Where the second case frame 30 rotates with respect to the first case frame 10 and to where the keypad 13 of the first case frame 10 is easily used, the state of the electronic device 100 is described as being open.

The touchscreen 190 for data input/output may be disposed on a front surface 31 of the second case frame 30. A proximity sensor 32 for sensing whether the second case frame 30 is opened/closed and a camera unit 33 for a self camera function may be disposed on the upper side of the touchscreen 190. However, it is not limited thereto and a plurality of sensors and devices may be additionally disposed on the front surface 31 of the second case frame 30.

Figure 3:
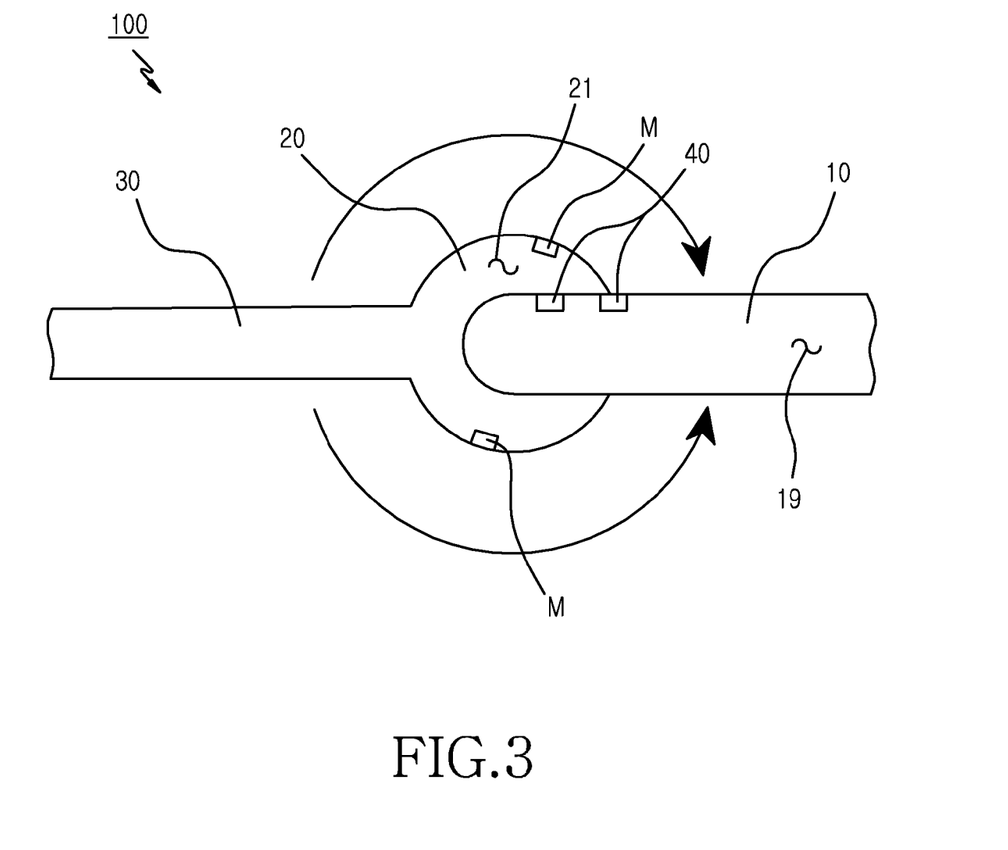
FIG. 3 is a diagram illustrating a state where a magnetic force sensing sensor is applied to an electronic device according to an embodiment of the present invention.

According to an embodiment, at least one magnet M may be installed at a position corresponding to the magnetic force sensing sensor 40 of the second case frame 30. As seen in FIG. 3, the magnet M may be installed at a predetermined interval or at a specific position with respect to the magnetic force sensing sensors 40.

The hinge portion 20 may be formed or installed integrally with the second case frame 30. The hinge portion 20 may be configured using one or more hinges to allow the second case frame 30 to rotate by a predetermined angle.

Though not shown, the hinge portion 20 may include an electric connection means for electrically connecting the first case frame 10 with the second case frame 30. The electric connection means may extend from one side of the hinge portion 20 and be connected with the circuit board of the first case frame 10. The electric connection means may be a Flexible Printed Circuit (FPC) or a flexible cable. Therefore, the first case frame 10 and the second case frame 30 may be electrically coupled.

According to an embodiment of the present invention, the hinge portion 20 may be variously configured depending on an operation structure of the electronic device 100. The hinge portion 20 may be applied as illustrated in FIG. 1 or 2, and a separate member for rotation of the case frame of the electronic device 100 may be installed or integrally formed. For example, the hinge portion 20 may be implemented to have two rotational axes and rotating mutually. However, the hinge portion 20 is not limited thereto, and the hinge portion 20 may be structured according to various known technologies.

According to an embodiment of the present invention, the electronic device 100 may perform an operation mode change depending on a rotational angle of the hinge portion 20. The operation mode change may include a software mode change such as a smartphone mode, a tablet PC mode, or a laptop PC mode, and a hardware device mode change. The operation mode change may include a resolution setting change or a user interface setting change. For example, the user interface setting change may include an arrangement state change of at least one icon, an icon size change, or change in the number of icons.

FIG. 3 is a diagram illustrating a state where a magnetic force sensing sensor 40 is applied to an electronic device according to an embodiment of the present invention.

Referring to FIG. 3, the hinge portion 20 of the electronic device 100 may be integrally formed with the second case frame 30, and the hinge portion 20 may rotate up to 360° around a rotational axis. Likewise, the second case frame 30 may rotate by a predetermined angle from the first case frame 10. That is, one side of the second case frame 30 may be disposed to overlap one side of the first case frame 10.

According to an embodiment of the present invention, at least one magnetic force sensing sensor 40 may be installed in an inner space 19 of the first case frame 10. The magnetic force sensing sensor 40 may be disposed with a predetermined interval or at a specific position. The magnetic force sensing sensor 40 senses a magnetic force of at least one magnet M installed in an inner space 21 of the hinge portion 20. The magnet M may be installed at a position corresponding to the magnetic force sensing sensor 40.

The magnetic force sensing sensor 40 may be a Hall sensor or a rotation sensor. The magnetic force sensing sensor 40 detects the rotational angle or rotational direction of the hinge portion 20 by the magnetic force of the magnet M of the hinge portion 20 while the hinge portion 20 rotates. For example, the magnetic force of the magnet M may be sensed by a lead switch.

Though the electronic device 100 has been illustrated to include the first case frame 10 and the second case frame 30 forming the electronic device 100, and allow the second case frame 30 to rotate via one hinge portion 20, the electronic device 100 is not limited thereto. For example, the electronic device 100 may have a plurality of hinge portions. A plurality of magnets may be installed on the plurality of hinge portions, respectively, and at least one magnetic force sensing sensor may be installed at a corresponding position.

FIGS. 4 to 7 are operational side views explaining an operating method of the second case frame 30 according to an embodiment of the present invention. Also, FIGS. 5B and 6B illustrate a method for detecting the rotational angle and rotational direction of the hinge portion.

Figure 4:
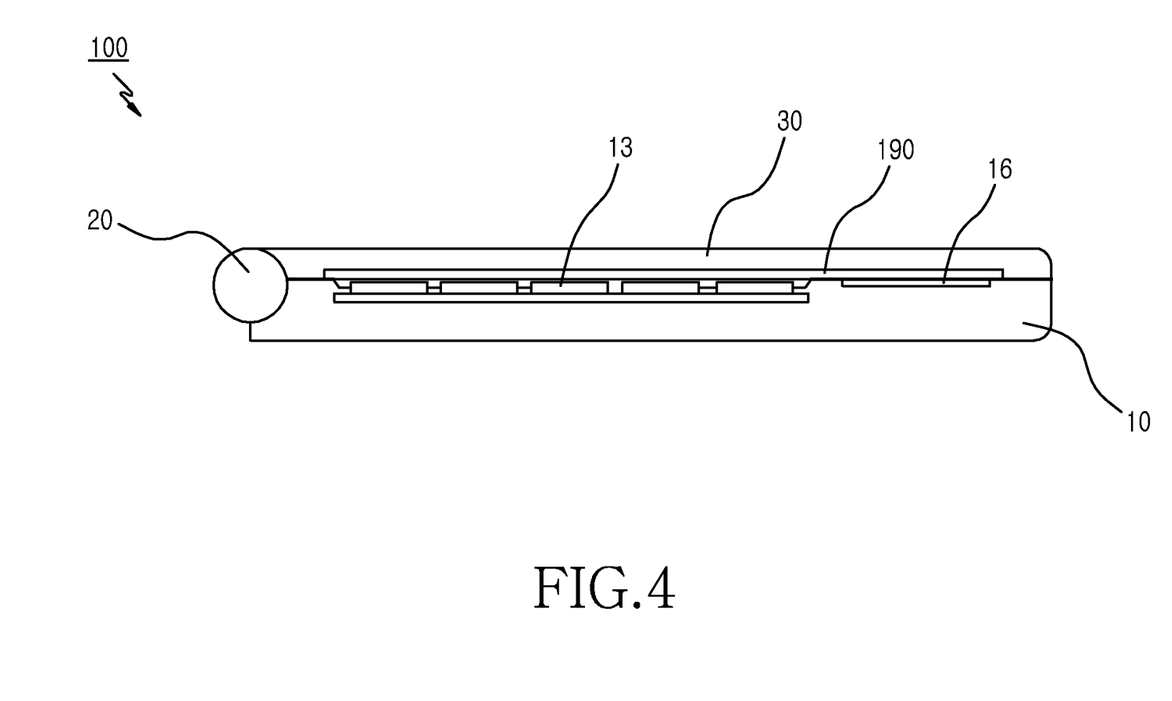
FIG. 4 is a side operational view for explaining an operating method of a second case frame according to an embodiment of the present invention.

Referring to FIG. 4, the electronic device 100 is in a closed state where the second case frame 30 rotates and is disposed to overlap the upper surface of the first case frame 10. In this case, the keypad 13 and the touchpad 16 of the first case frame 10 are not exposed to the outside, and the touchscreen 190 of the second case frame 30 may be disposed to contact the outer surface of the first case frame 10. The hinge portion 20 may serve as a path for electrical connection between the first case frame 10 and the second case frame 30. Also, the electronic device 100 may inactivate an input/output function of the touchscreen 190 to prevent the touchscreen 190 from wasting power.

Figure 5A:
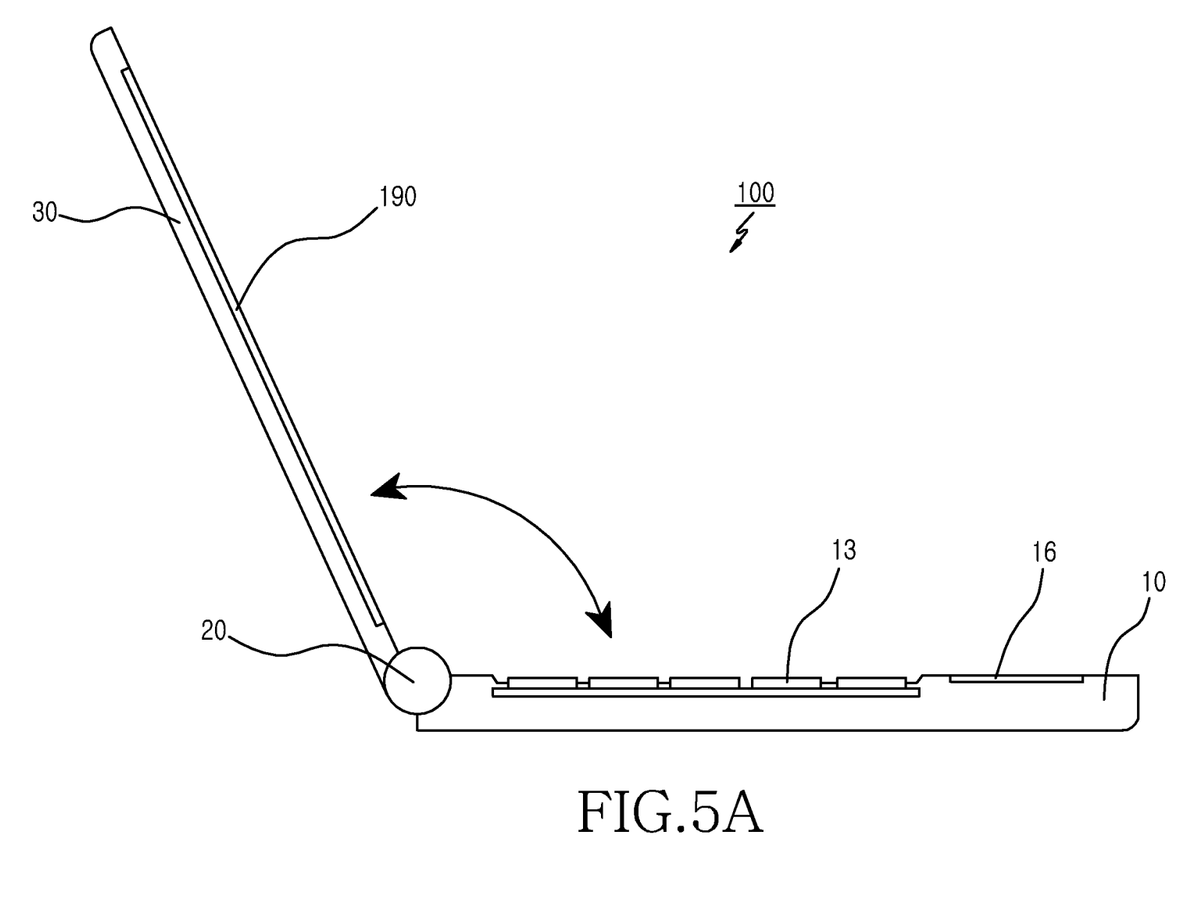
FIGS. 5A and 5B are side operational views for explaining an operating method of a second case frame according to an embodiment of the present invention.

FIG. 5A is a view illustrating a state where the second case frame 30 rotates by a predetermined angle from the state of FIG. 4.

Referring to FIG. 5A, the electronic device 100 is in an open state where the second case frame 30 rotates from the first case frame 10 to facilitate use of the keypad 13, the touchpad 16, and the touchscreen 190. In this case, the electronic device 100 may operate in a laptop PC mode.

Figure 5B:
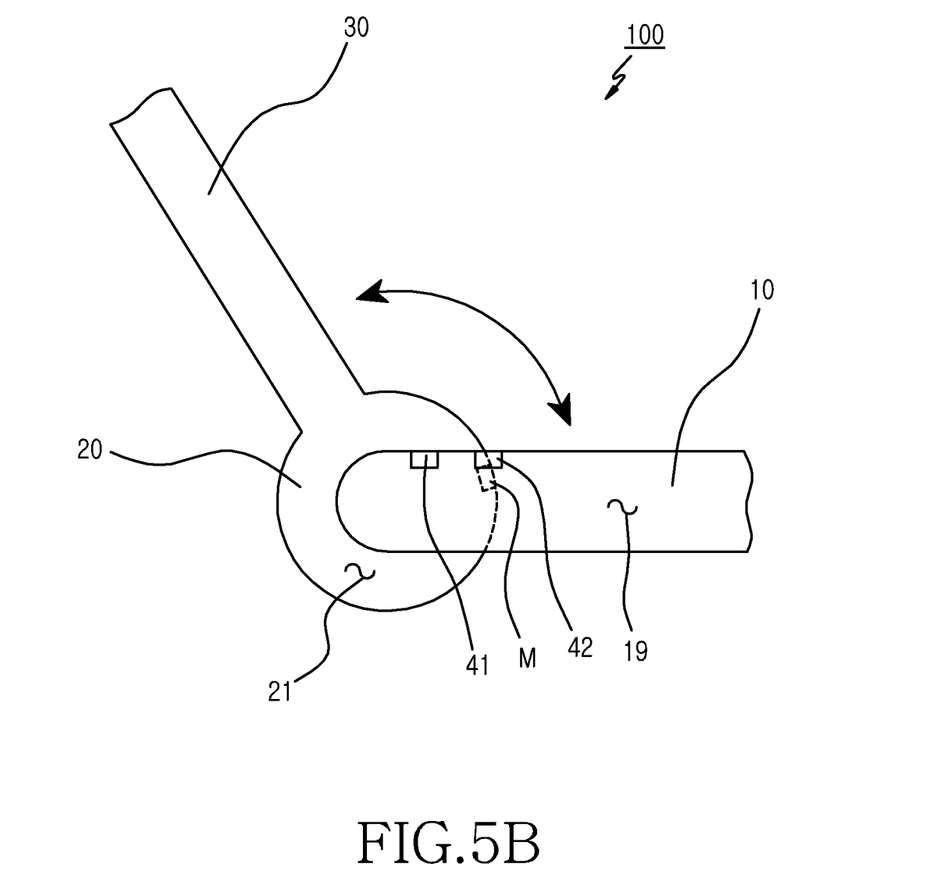

As illustrated in FIG. 5B, a first magnetic force sensing sensor 41 and a second magnetic force sensing sensor 42 may be installed with a predetermined interval or at a specific region in the inner space 19 of the first case frame 10. The first magnetic force sensing sensor 41 and the second magnetic force sensing sensor 42 may sense magnetic force of the magnet M installed in the inner space 21 of the rotating hinge portion 20.

According to an embodiment of the present invention, the electronic device 100 may detect the rotational angle of the hinge portion 20 depending on whether the first magnetic force sensing sensor 41 and the second magnetic force sensing sensor 42 sense the magnet M. For example, in the case where at least one of the first magnetic force sensing sensor 41 and the second magnetic force sensing sensor 42 senses magnetic force of the magnet M, the electronic device 100 may determine the rotational angle of the hinge portion 20 is less than a reference angle. In this case, the electronic device 100 may operate in a laptop PC mode.

The electronic device 100 may also detect the rotational direction of the hinge portion 20 depending on a sequence of sensing the magnet M by the first magnetic force sensing sensor 41 and the second magnetic force sensing sensor 42. For example, in the case where the first magnetic force sensing sensor 41 senses the magnetic force of the magnet M and then the second magnetic force sensing sensor 42 senses the magnetic force of the magnet M, the electronic device 100 may recognize the rotational direction of the hinge portion 20 is a clockwise direction.

Figure 6A:
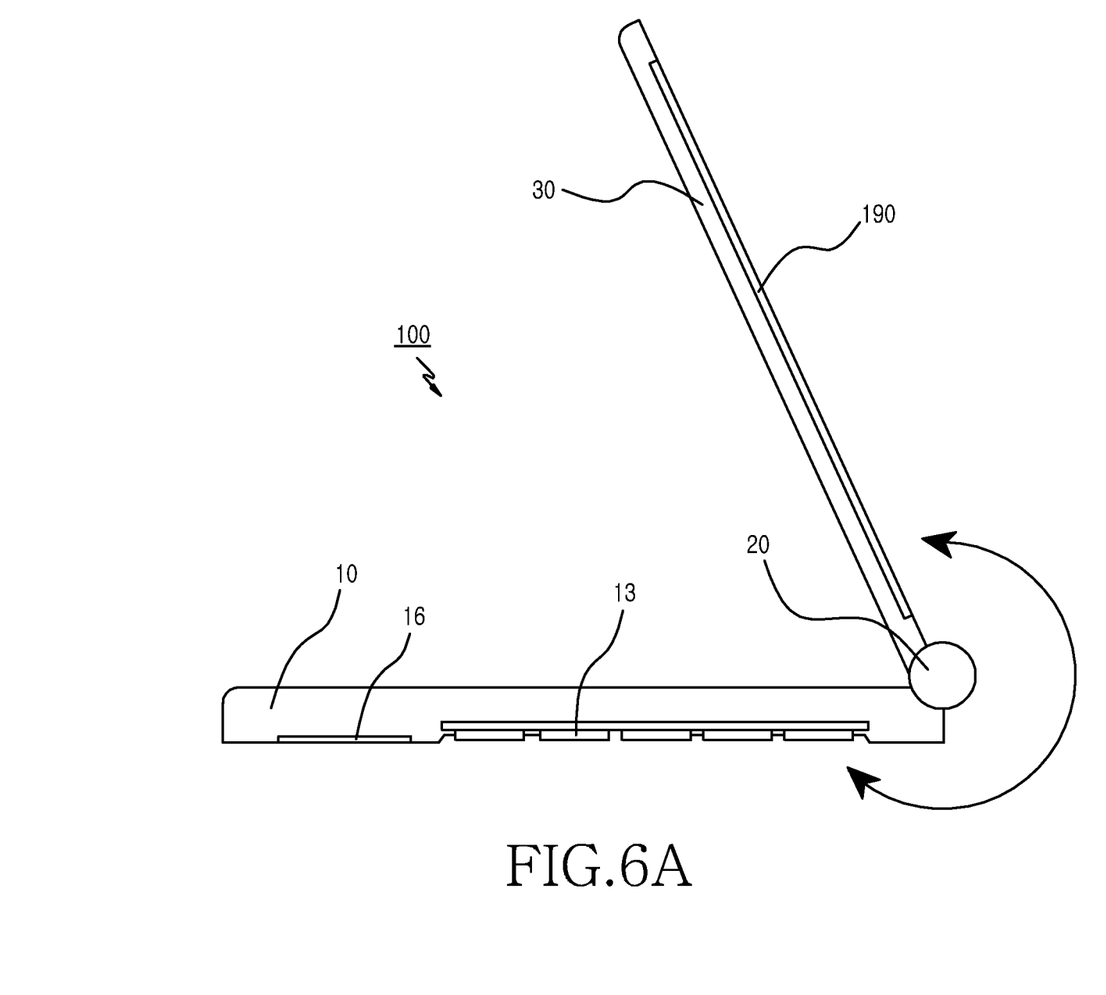
FIGS. 6A and 6B are side operational views for explaining an operating method of a second case frame according to an embodiment of the present invention.

FIG. 6A is a side view illustrating a state where the second case frame 30 rotates further by a predetermined angle from the state of FIG. 5A.

Referring to FIG. 6A, the electronic device 100 is in a state where it may operate in a tablet PC mode. In this case, the touchscreen 190 of the second case frame 30 may receive an input via an input means such as a finger or a touch pen. The first case frame 10 improves usability of the electronic device 100 by serving as a cradle supporting the electronic device 100. The keypad 13 of the first case frame 10 is separated from the surface upon which the first case frame 10 rests. In this case the electronic device 100 operates in the tablet PC mode, and the electronic device 100 prevents a malfunction of the electronic device 100 by inactivating the function of the keypad 13 and the touchpad 16 of the electronic device 100. The user interface changes depending on the operation mode change of the electronic device 100. For example, the arrangement state of at least one icon on the touchscreen 190, an icon size, or the number of icons may change.

Figure 6B:
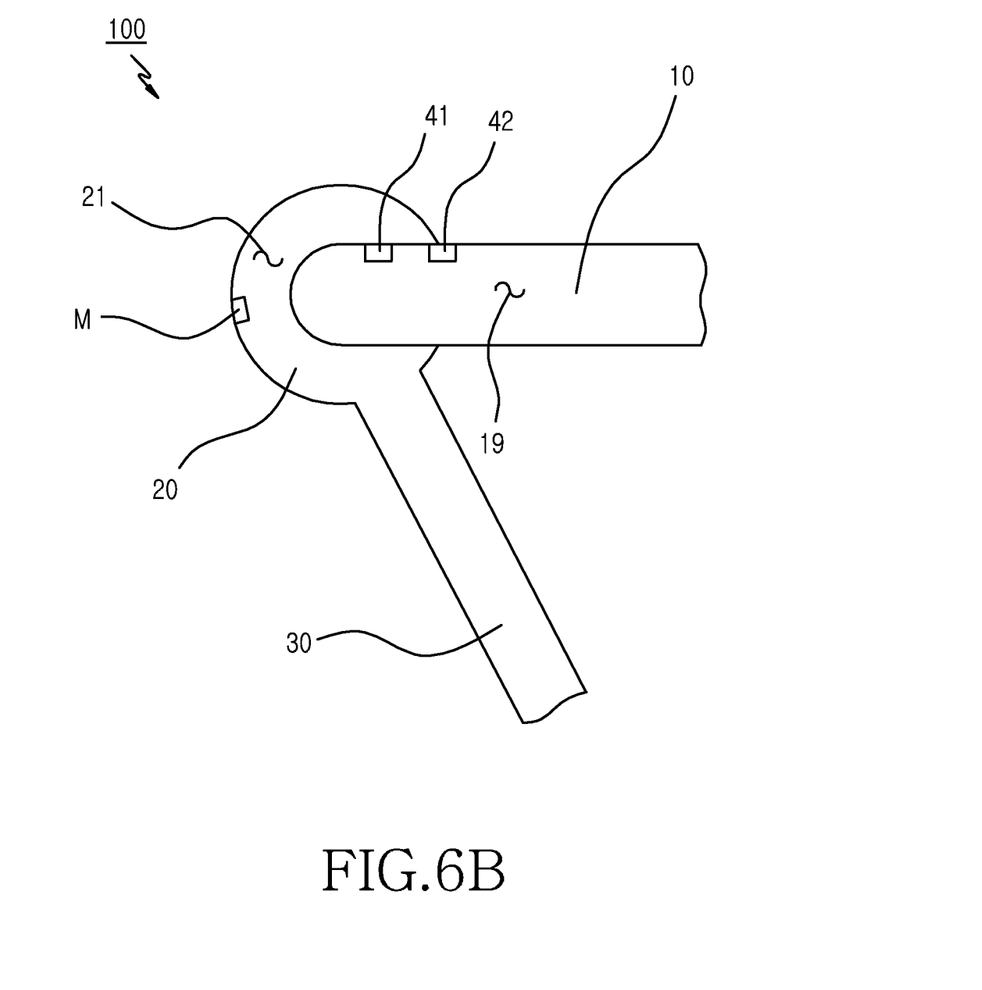

As illustrated in FIG. 6B, the first magnetic force sensing sensor 41 and the second magnetic force sensing sensor 42 may be installed with a predetermined interval or at a specific region in the inner space 19 of the first case frame 10. The first magnetic force sensing sensor 41 and the second magnetic force sensing sensor 42 senses magnetic force of the magnet M installed in the inner space 21 of the rotating hinge portion 20.

According to an embodiment of the present invention, the electronic device 100 detects the rotational angle of the hinge portion 20 depending on whether the first magnetic force sensing sensor 41 and the second magnetic force sensing sensor 42 sense the magnet M. For example, where the first magnetic force sensing sensor 41 and the second magnetic force sensing sensor 42 cannot sense the magnetic force of the magnet M, the electronic device 100 determines that the rotational angle of the hinge portion 20 is greater than or equal to a reference angle. In this case, the electronic device 100 operates in the tablet PC mode.

Figure 7:
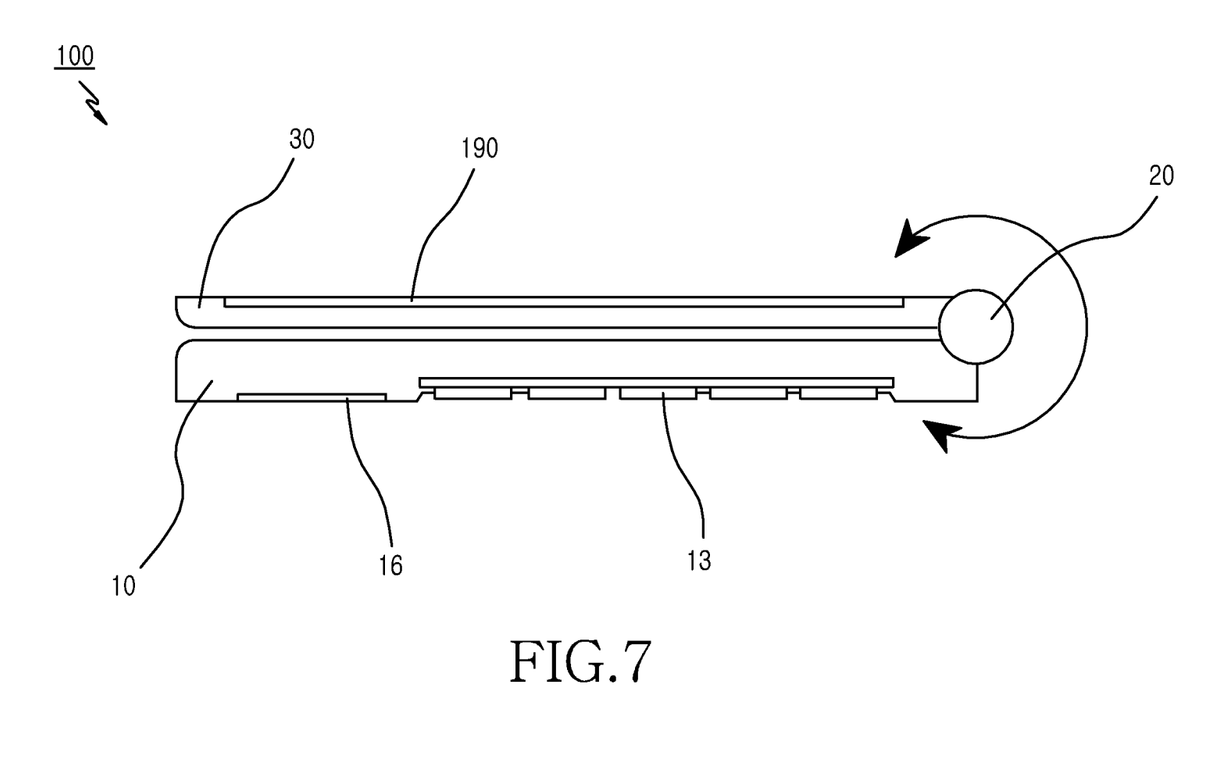
FIG. 7 is a side operational view for explaining an operating method of a second case frame according to an embodiment of the present invention.

FIG. 7 is a side view illustrating a state where the second case frame 30 of the electronic device 100 has been rotated by 360°

Referring to FIG. 7, the second case frame 30 of the electronic device 100 is disposed to overlap the backside of the first case frame 10. In this case, the electronic device 100 operates in a tablet PC mode as illustrated in the state of FIG. 6B. In this case, the touchscreen 190 of the second case frame 30 receives an input via an input means such as a finger or a touch pen. The first case frame 10 improves usability of the electronic device 100 by serving as a cradle supporting the electronic device 100. The keypad 13 of the first case frame 10 may be separated from the surface upon which the first case frame 10 rests. In this case the electronic device 100 operates in the tablet PC mode, and the electronic device 100 prevents a malfunction of the electronic device 100 by inactivating the function of the keypad 13 and the touchpad 16 of the electronic device 100. The user interface changes depending on the operation mode change of the electronic device 100. For example, the arrangement state of at least one icon on the touchscreen 190, an icon size, or the number of icons may change.

According to an embodiment of the present invention, the electronic device 100 may re-change the operation mode from the tablet PC mode to the laptop PC mode in the case where the second case frame 30 rotates to the position shown in FIG. 6A. In this case, the electronic device 100 reactivates the input function of the keypad 13 and the touchpad 16. Therefore, a user may change the operation mode of the electronic device 100 and use the same depending on the rotational angle of the second case frame 30.

Although the above embodiments illustrate one hinge portion 20 of the electronic device 100 and one magnet M installed to the hinge portion 20, it is not limited thereto. For example, the electronic device 100 may include a plurality of hinge portions, and a plurality of magnets installed in the hinge portion may be provided.

Also, although the above embodiments illustrate two magnetic force sensing sensors 41 and 42 installed in the first case frame 10 of the electronic device 100, it is not limited thereto.

Further, although a construction where the first case frame 10 and the second case frame 30 rotate in such a way that they are mutually hinged is described, it is not limited thereto. For example, the magnetic force sensing sensor 40 may be disposed at a position corresponding to the magnet M of the case frame even when the two case frames are configured in various rotation types of electronic devices, such as a sliding type, a popup type, a swivel type, etc.

Figure 8:
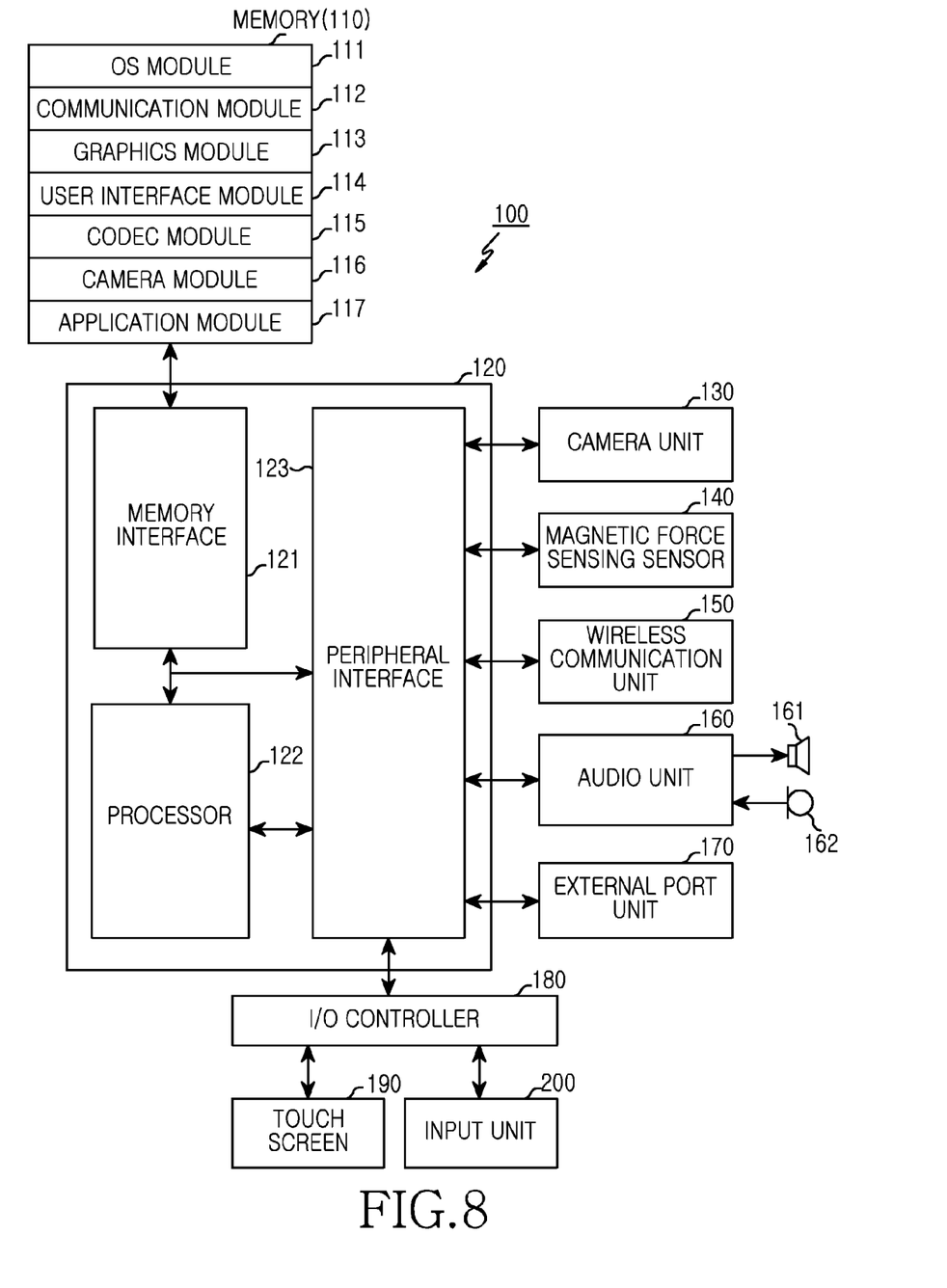
FIG. 8 is a block diagram illustrating an electronic device according to an embodiment of the present invention.

FIG. 8 is a block diagram illustrating an electronic device according to an embodiment of the present invention.

Referring to FIG. 8, the electronic device 100 may include a memory 110, a processor unit 120, a camera unit 130, a magnetic force sensing sensor 140, a wireless communication unit 150, an audio unit 160, an external port unit 170, an input/output (I/O) controller 180, a touchscreen 190, and an input unit 200. Also, a plurality of memories 110 and a plurality of external port units 170 may be provided.

The processor unit 120 may include a memory interface 121, at least one processor 122, and a peripheral interface 123. Here, the memory interface 121, the at least one processor 122, and the peripheral interface 123 included in the processor unit 120 may be integrated in at least one integrated circuit or implemented as separate elements.

The memory interface 121 may control an access of the memory 110 by the elements such as the processor 122 and the peripheral interface 123.

The peripheral interface 123 may control connection between I/O peripherals of the electronic device 100, and the processor 122 and the memory interface 121.

The processor 122 may control the electronic device 100 to provide various multimedia services using at least one software program. The processor 122 may execute at least one program stored in the memory 110 to provide a service corresponding to the relevant program.

The processor 122 executes various software programs to perform various functions for the electronic device 100, and performs processes and controls for voice communication, video communication, and data communication. The processor 122 may perform a method of an embodiment of the present invention in cooperation with software modules stored in the memory 110.

According to an embodiment of the present invention, the processor 122 may control to perform an operation mode change depending on the rotational information of the hinge portion 20. The rotational information may include the rotational angle, rotational direction, or rotational speed of the hinge portion 20. The operation mode change may include a software mode change such as a smartphone mode, a tablet PC mode, or a laptop PC mode, and a hardware device mode change. The operation mode change may also include a resolution setting change or a user interface setting change. For example, the user interface setting change may include an arrangement state change of at least one icon, an icon size change, or a change in the number of icons.

The processor 122 may include one or more data processors, image processors, or CODECs. Furthermore, the electronic device 100 may configure a data processor, an image processor, or a CODEC, separately.

The camera unit 130 may perform a camera function such as a photo and video clip recording. The camera unit 130 may include a Charge Coupled Device (CCD) or a Complementary Metal Oxide Semiconductor (CMOS). Also, the camera unit 130 may change hardware configuration, for example, control lens movement, a number of an aperture, etc. depending on a camera program executed by the processor 122.

Various elements of the electronic device 100 may be connected via one or more communication buses or electric connection means.

The magnetic force sensing sensor 140 may be at least one Hall sensor or rotational sensor capable of sensing the magnetic force of the magnet M. The magnetic force sensing sensor 140 detects whether the magnetic force of at least one magnet M is sensed or detects a sensed sequence of the at least one magnet M, etc. to provide the magnetic force sense information to the processor 122. The magnetic force sensing sensor 140 may sense the magnetic force of the magnet M via a combination of various sensors.

The wireless communication unit 150 enables wireless communication, and may include Radio Frequency (RF) transmitter/receiver, or light (for example, an infrared) transmitter/receiver. The wireless communication unit 150 may be designed to operate via one or more of a GSM network, an EDGE network, a CDMA network, a W-CDMA network, an LTE network, an OFDMA network, a Wi-Fi network, a WiMax network, or a Bluetooth network depending on a communication network.

The audio unit 160 may be connected to a speaker 161 and a microphone 162 to provide the electronic device 100 with voice recognition, voice duplication, digital recording, or an audio input/output such as a communication function, etc. The audio unit 160 may provide an audio interface between a user and the electronic device 100, receive a data signal from the processor unit 120, convert the received data signal to an electric signal, and output the converted electric signal via the speaker 161.

The speaker 161 may convert an electric signal to an audible frequency band and output the same, and may be disposed in the front or rear of the electronic device 100. The speaker 161 may include a flexible film speaker where at least one piezoelectric body has been attached to one vibration film.

The microphone 162 may convert a sound wave transferred from a person or other sound sources to an electric signal. Also, the audio unit 160 may receive an electric signal from the microphone 162, convert the received electric signal to an audio data signal, and transmit the converted audio data signal to the processor unit 120. The audio unit 160 may include an earphone, an ear set, a headphone, or a headset detachable from the electronic device 100.

The external port unit 170 may directly connect the electronic device 100 with a counterpart electronic device, or indirectly connect the electronic device 100 with a counterpart electronic device via a network (for example, the Internet, an Intranet, a wireless LAN, etc.).

The I/O controller 180 provides an interface between the I/O unit such as the touchscreen 190 and the input unit 200, and the peripheral interface 123.

The touchscreen 190 provides an input/output interface between the electronic device 100 and a user. For example, the touchscreen 190 may apply a touch detect technology, transfer a user's touch input to the processor unit 120, and show visual information, text, graphics, or video, etc. provided from the processor unit 120 to a user.

The touchscreen 190 also displays state information of the electronic device 100, a character input by a user, a moving picture, a still picture, etc. The touchscreen 190 may also display information of an application driven by the processor 122.

The touchscreen 190 may further apply an arbitrary multi-touch detect technology including not only capacitive, resistive, infrared, and surface acoustic wave technologies but also other proximity sensor arrangements or other elements. The touchscreen 190 may be at least one of a Liquid Crystal Display (LCD), an Organic Light Emitting Diode (OLED), an Active Matrix Organic Light Emitting Diode (AMOLED), a flexible display, and a three dimensional display.

The input unit 200 provides input data generated by a user's selection to the processor 122 via the I/O controller 180. At this point, the input unit 200 may include a keypad including at least one hardware button, and a touchpad detecting touch information. The input unit 200 may include an up/down button for volume control, and include at least one of a push button, a locker button, a locker switch, a thumb-wheel, a dial, a stick, and a pointer device such as a stylus, etc.

The memory 110 may include a high speed random access memory such as one or more magnetic disk storages, or a non-volatile memory, one or more optical storage devices, or a flash memory (for example, NAND, NOR). The memory 110 stores software, and the software may include an Operating System (OS) module 111, a communication module 112, a graphics module 113, a user interface module 114, a codec module 115, a camera module 116, and an application module 117. The term "module" may be also expressed as a set of instructions, an instruction set, or a program.

The OS module 111 may include WINDOWS, LINUX, Darwin, RTXC, UNIX, OS X, or a built-in OS such as VxWorks, and include various software elements for controlling a general system operation. This control of the general system operation may include memory control and management, storage hardware (device) control and management, power control and management, etc. The OS module 111 may also perform swift communication between various hardware (devices) and software elements (modules).

The communication module 112 enables communication with a counterpart electronic device such as a computer, a server, an electronic device, etc. via the wireless communication unit 150 or the external port unit 170. The communication module 112 may communicate with a counterpart electronic device and control to share at least a portion of sharable items of the electronic device 100.

The graphics module 113 may include various software elements for providing and displaying graphics on the touch-screen 190. The term "graphics" may mean text, a web page, an icon, a digital image, a video, an animation, etc.

The user interface module 114 may include various software elements related to a user interface. The user interface module 114 may control to display information of an application driven by the processor 122 on the touchscreen 190. Also, the user interface module 114 may include contents regarding how the state of the user interface changes or under what condition the user interface state changes. The user interface module 114 may include a related process module and various routines for user interface operation support depending on an operation mode.

According to an embodiment of the present invention, the user interface module 114 may change a user interface setting depending on an operation mode of the electronic device 100. For example, the operation mode may include a software mode such as a smartphone mode, a tablet Personal Computer (PC) mode or a laptop PC mode, or a hardware device mode.

The CODEC module 115 may include a software element related to encoding and decoding of a video file.

The camera module 116 may include camera-related software elements enabling camera-related processes and functions.

The application module 117 may include a software element regarding at least one application installed on the electronic device 100. This application may include a browser, an e-mail, a phonebook, games, a short message service, a multimedia message service, a Social Network Service (SNS), an instant message, a morning call, an MP3 player, schedule management, a camera, word processing, keyboard emulation, an address book, a contact list, a widget, Digital Rights Management (DRM), voice recognition, voice duplication, a position determining function, or a position-based service, etc.

The processor unit 120 may include an additional module (instructions) besides the above-described modules. Also, various functions of the electronic device 100 according to an embodiment of the present invention may include a hardware including one or more processors or Application Specific Integrated Circuit (ASIC) and software.

Figure 9:
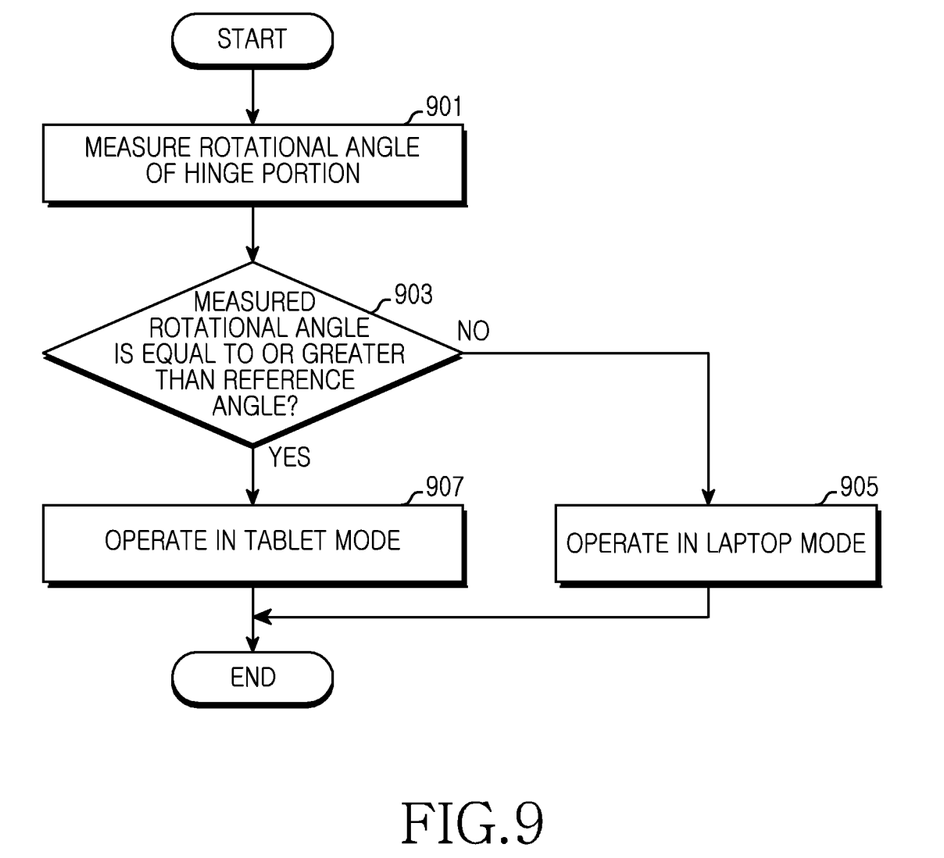
FIG. 9 is a flowchart illustrating a method for operating an electronic device according to an embodiment of the present invention.

FIG. 9 is a flowchart illustrating a method for operating an electronic device 100 according to an embodiment of the present invention.

Referring to FIG. 9, the electronic device 100 measures the rotational angle of the hinge portion in step 901. Next, the electronic device 100 determines whether the measured rotational angle is greater than or equal to a reference angle in step 903. As illustrated in FIG. 3, the electronic device 100 may detect a plurality of magnets M installed on the second case frame 30 using a plurality of magnetic force sensing sensors 40 installed on the first case frame 10. The electronic device 100 determines whether the rotational angle is greater than or equal to the reference angle depending on whether the magnetic force sensing sensor 40 senses the magnetic force.

In the case where the measured rotational angle is less than the reference angle, the electronic device 100 may operate in a laptop mode in step 905. According to an embodiment, the operation mode of the electronic device 100 may include a software mode such as a smartphone mode, a tablet Personal Computer (PC) mode, or a laptop PC mode, or a hardware device mode. In case of operating in the laptop PC mode, the electronic device 100 may activate an input function of the keypad, and inactivate a touch input function of the touchscreen 190.

In the case where the measured rotational angle is greater than or equal to the reference angle, the electronic device 100 may operate in the tablet PC mode in step 907. According to an embodiment, in case of operating in the tablet PC mode, the electronic device 100 may inactivate the input function of the keypad and activate the touch input function of the touchscreen 190. Also, as illustrated in FIG. 6A, the first case frame 10 including the keypad 13 of the electronic device 100 may increase user convenience of the electronic device 100 by serving as a cradle.

Figure 10:
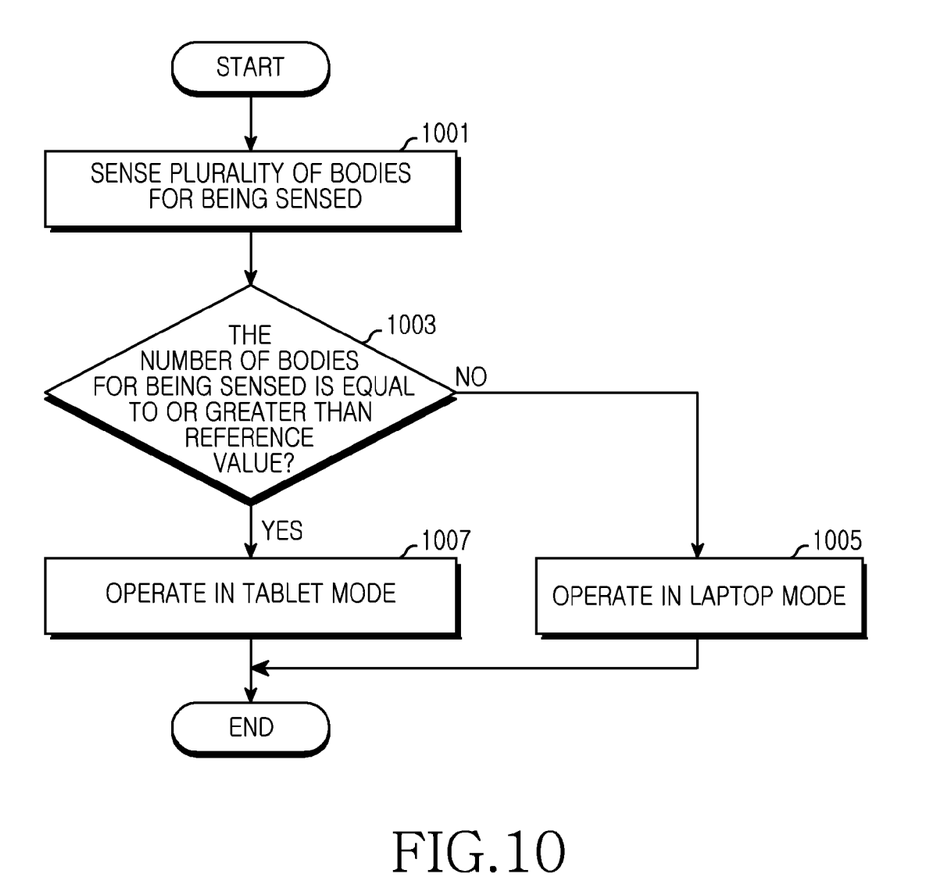
FIG. 10 is a flowchart illustrating a method for operating an electronic device according to an embodiment of the present invention.

FIG. 10 is a flowchart illustrating a method for operating an electronic device 100 according to an embodiment of the present invention.

Referring to FIG. 10, the electronic device 100 may detect a plurality of bodies for being sensed in step 1001. According to an embodiment of the present invention, the body for being sensed may be a magnet, and the magnet may be installed to the case frame of the electronic device 100. Also, a magnetic force sensing means may be installed at a position corresponding to the magnet of the electronic device 100. The magnetic force sensing means may be, for example, a Hall sensor or a lead switch, and may detect the magnetic force of the magnet. A plurality of bodies for being sensed and a plurality of magnetic force sensing means may be provided. The number and the installation position may be implemented variously depending on an operation form of the electronic device 100.

Next, the electronic device 100 determines whether the number of sensed bodies for being sensed is greater to or equal to a reference value in step 1003. According to an embodiment of the present invention, the magnetic force sensing means installed on the electronic device 100 may determine the number of bodies for being sensed. As illustrated in FIG. 3, the body for being sensed may be the magnet M, and at least one magnet M may be installed on the hinge portion 20 of the electronic device 100. In the case where the second case frame 30 rotates with respect to the first case frame 10, the magnetic force sensing sensor 40 installed on the first case frame 10 may sense the plurality of magnets M installed on the second case frame 30 to determine the number of sensed magnets M.

In the case where the number of sensed bodies for being sensed is less than a reference value, the electronic device 100 may operate in the laptop mode in step 1005. In the case where the number of sensed bodies for being sensed is greater than or equal to a reference value, the electronic device 100 may operate in the tablet mode in step 1007.

According to an embodiment of the present invention, each module may be configured in software, firmware, hardware, or a combination thereof. All or a portion of a module may be configured in one entity and may perform the function of each module. According to various embodiments of the present invention, respective operations may be executed sequentially, repetitively, or in parallel. Some of operations may be omitted or other operations may be added and executed. For example, respective operations may be executed by a corresponding module described by the present invention.

When a module implementation is in the form of software, a computer readable storage medium for storing one or more programs (software modules) may be provided. One or more programs stored in the computer readable storage medium are configured for execution by one or more processors inside the electronic device. One or more programs may include instructions for enabling the electronic device to execute the methods according to the various embodiments of the present invention.

This program (a software module, software) may be stored in Random Access Memory (RAM), a non-volatile memory including a flash memory, Read Only Memory (ROM), an Electrically Erasable Programmable Read Only Memory (EEPROM), a magnetic disc storage device, a Compact Disc (CD)-ROM, Digital Versatile Discs (DVDs), or other types of optical storage devices, and a magnetic cassette. Alternatively, the program may be stored in a memory configured by a portion or all of these. Also, a plurality of respective element memories may be provided.

The program may be stored in an attachable storage accessible to the electronic device via a communication network such as the Internet, an Intranet, a Local Area Network (LAN), Wide LAN (WLAN), or Small Area Network (SAN), or a communication network configured in a combination of these. The storage may access the electronic device via an external port. Also, a separate storage on a communication network may access a portable electronic device.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An electronic device comprising:
a first case frame;
a second case frame installed to be rotatable from the first case frame;
a hinge portion for coupling the first case frame with the second case frame, and rotatably installed to rotate the second case frame;
a plurality of magnets installed on the hinge portion, used for detecting a rotation angle of the hinge portion;
a magnetic force sensing sensor installed on the first case frame for detecting the plurality of magnets; and
a processor for controlling to determine an operation mode of the electronic device depending on the rotation angle of the hinge portion,
wherein the processor detects the rotation angle of the hinge portion based on a number of the plurality of magnets sensed by the magnetic force sensing,
wherein, when the number of sensed magnets is less than a reference value, the electronic device operates in a first operation mode, and
wherein, when the number of sensed magnets is at least equal to the reference value, the electronic device operates in a second operation mode.

2. The electronic device of claim 1, wherein the second mode is a tablet mode, and the first mode is a laptop mode, wherein the first case frame comprises a keypad and the second case frame comprises a touchscreen.

3. The electronic device of claim 2, wherein when operating in the tablet mode, the processor controls to inactivate an input function of the keypad of the first case frame, and to activate a touch input function of the touchscreen of the second case frame.

4. The electronic device of claim 1, wherein the processor detects a rotation direction of the hinge portion based on a sequence in which the plurality of magnets are detected.

5. The electronic device of claim 1, wherein the magnetic force sensing sensor comprises a Hall sensor or a lead switch.

6. The electronic device of claim 1, wherein the processor controls to perform at least one of resolution setting change and user interface setting change in response to the determined operation mode.

7. The electronic device of claim 1, wherein the operation mode comprises a software mode such as a smartphone mode, a tablet Personal Computer (PC) mode and a laptop PC mode, or a hardware device mode.

8. A method in an electronic device, the method comprising:
 detecting a rotation angle of a hinge portion, the hinge portion coupling a first case frame and a second case frame forming the electronic device and rotatably installed to rotate the second case frame; and
 determining an operation mode of the electronic device depending on the detected rotation angle of the hinge portion,
 wherein detecting the rotation angle of the hinge portion comprises detecting, by a magnetic force sensing sensor installed on the first case frame, the rotation angle of the hinge portion based on a number of a plurality of magnets sensed by the magnetic force sensing sensor, the plurality of magnets being installed on the hinge portion,
 wherein, when the number of sensed magnets is less than a reference value, the electronic device operates in a first operation mode, and
 wherein, when the number of sensed magnets is at least equal to the reference value, the electronic device operates in a second operation mode.

9. The method of claim 8, wherein the second mode is a tablet mode, and the first mode is a laptop mode,
 wherein the first case frame comprises a keypad and the second case frame comprises a touchscreen.

10. The method of claim 9, wherein when operating in the tablet mode, an input function of the keypad of the first case frame is inactivated, and a touch input function of the touchscreen of the second case frame is activated.

11. The method of claim 9, further comprising:
 detecting a rotational direction of the hinge portion based on a sequence in which the plurality of magnets has been detected.

12. The method of claim 8, wherein the magnetic force sensing sensor comprises a Hall sensor or a lead switch.

13. The method of claim 8, wherein the operation mode comprises a software mode such as a smartphone mode, a tablet Personal Computer (PC) mode and a laptop PC mode, or a hardware device mode.

14. An electronic device comprising:
 at least one processor;
 a memory; and
 at least one program stored in the memory and executed by the at least one processor,
 wherein the program detects a rotation angle of a hinge portion, the hinge portion coupling a first case frame and a second case frame forming the electronic device, and rotatably installed to rotate the second case frame, and the program determines an operation mode of the electronic device depending on the detected rotation angle of the hinge portion,
 wherein detecting the rotation angle of the hinge portion comprises detecting, by a magnetic force sensing sensor installed on the first case frame, the rotation angle of the hinge portion based on a number of a plurality of magnets sensed by the magnetic force sensing sensor, the plurality of magnets being installed on the hinge portion,
 wherein, when the number of sensed magnets for being sensed is less than a reference value, the electronic device operates in a first operation mode, and
 wherein, when the number of sensed magnets is at least equal to the reference value, the electronic device operates in a second operation mode.

* * * * *